(12) United States Patent
Salter et al.

(10) Patent No.: US 10,730,376 B2
(45) Date of Patent: Aug. 4, 2020

(54) TRUCK FOLDUP BED COVER

(71) Applicant: FORD GLOBAL TECHNOLOGIES, LLC, Dearborn, MI (US)

(72) Inventors: Stuart C. Salter, White Lake, MI (US); David Brian Glickman, Southfield, MI (US); Christopher Anthony Danowski, Rochester Hills, MI (US); Paul Kenneth Dellock, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/210,039

(22) Filed: Dec. 5, 2018

(65) Prior Publication Data

US 2020/0180413 A1 Jun. 11, 2020

(51) Int. Cl.
*B60J 7/14* (2006.01)

(52) U.S. Cl.
CPC ..................... *B60J 7/141* (2013.01)

(58) Field of Classification Search
CPC ................... B60J 7/141; B60J 7/143
USPC .............. 296/100.07, 100.09, 146.15, 190.1; 160/229.1, 236, 130, 180
See application file for complete search history.

(56) References Cited

U.S. PATENT DOCUMENTS

| | | | |
|---|---|---|---|
| 7,673,921 B2 | 3/2010 | Hirayama et al. | |
| 8,690,224 B2 | 4/2014 | Maimin et al. | |
| 8,960,765 B2 | 2/2015 | Facchinello et al. | |
| 9,004,571 B1 | 4/2015 | Bernardo et al. | |
| 9,266,416 B1 | 2/2016 | Nania | |
| 10,046,632 B2 | 8/2018 | Dylewski et al. | |
| 2016/0114666 A1* | 4/2016 | Xu | B60J 7/141 |
| | | | 296/100.07 |
| 2016/0332679 A1* | 11/2016 | Krishnan | B60J 7/1607 |
| 2018/0118004 A1 | 5/2018 | Schmeichel et al. | |

FOREIGN PATENT DOCUMENTS

| | | |
|---|---|---|
| CA | 2078821 A1 | 10/1992 |
| JP | 11-129816 * | 5/1999 |
| WO | 2017070786 A1 | 5/2017 |

OTHER PUBLICATIONS https://truck-hero.com/undercover-flex-truck-bed-cover.

* cited by examiner

*Primary Examiner* — Dennis H Pedder
(74) *Attorney, Agent, or Firm* — David Coppiellie; MacMillan, Sobanski & Todd, LLC

(57) ABSTRACT

A pickup truck and tonneau cover including hard panels configured to selectively secure horizontally and vertically over a pickup truck bed, with a window in each panel, each window located to align with the other windows when the panels are oriented vertically in a fully retracted position.

15 Claims, 4 Drawing Sheets

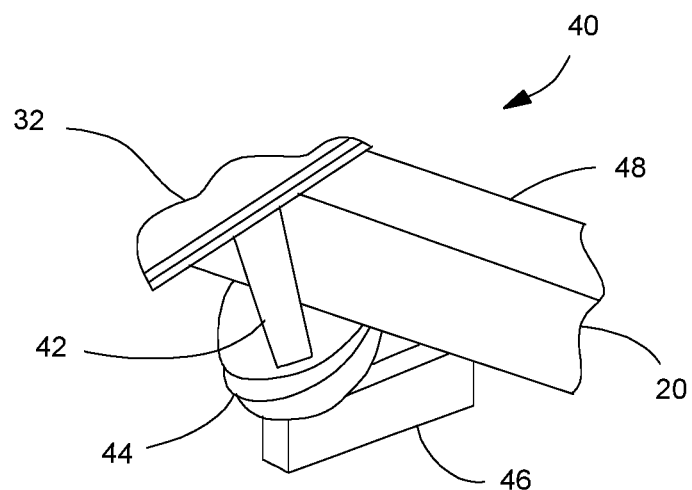
Fig. 5
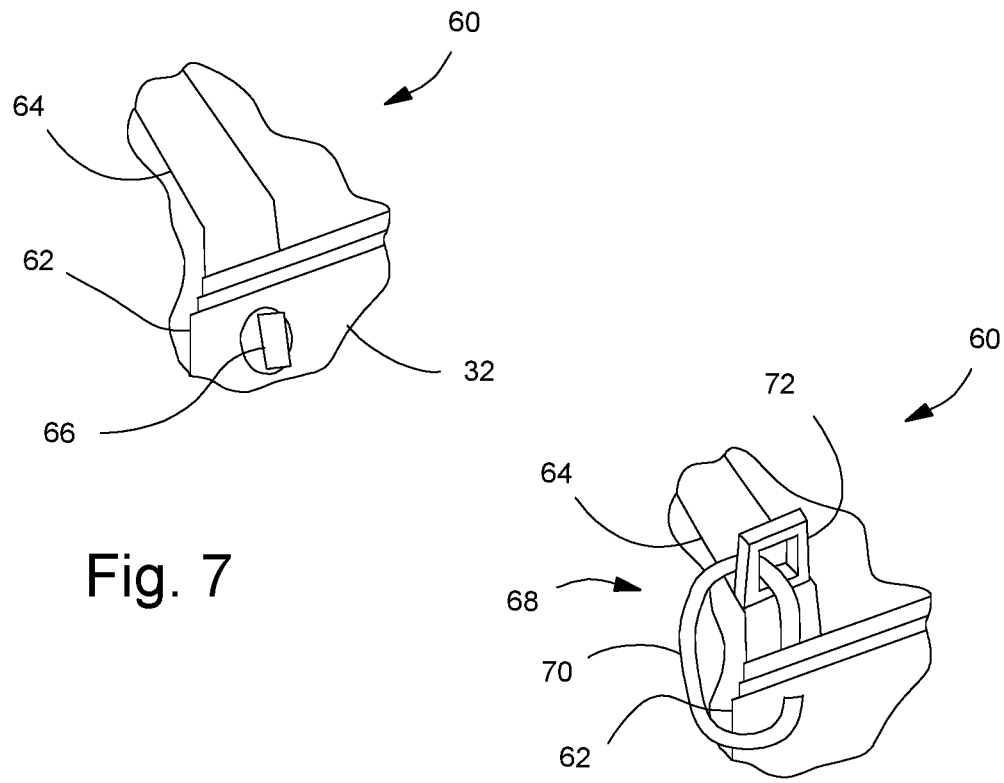
Fig. 7
Fig. 8

TRUCK FOLDUP BED COVER

BACKGROUND OF THE INVENTION

The present invention relates to bed covers for pickup trucks and in particular bed covers that foldup while allowing for rear visibility from the truck cab.

Removable tonneau covers are commonly used to cover the beds of pickup trucks in order to keep items stored in the bed covered from the elements and out of sight. To carry larger items that will extend up out of the bed, many tonneau covers are partially or completely removable by rolling or folding the cover to expose part of the bed. Complete removal can be cumbersome and require finding somewhere to store the cover. Partial removal, whether rolled or folded, results in part of the bed still being covered by the cover, thus still limiting full access to the bed somewhat. Moreover, there are some advantages with a hard cover that folds over a soft cover that rolls-up, but the hard cover will tend to block more access to the bed when folded than the soft cover when rolled. In order to overcome this limitation to access of the bed, some hard tonneau covers may be folded up vertically behind the vehicle cab, at the front of the bed. However, this blocks the rear view of the pickup truck driver.

SUMMARY OF THE INVENTION

An embodiment contemplates a tonneau cover including a plurality of hard panels configured to selectively secure horizontally and vertically over a pickup truck bed; and a window in each panel, each window located to align with the other windows when the panels are oriented vertically in a fully retracted position.

An embodiment contemplates a pickup truck including a bed behind a cab having a rear window; a tonneau cover including a plurality of hard panels selectively securable horizontally and vertically over the bed; and a window in each panel, each window located to align with the other panel windows and the rear window when the panels are oriented vertically in a fully retracted position.

An advantage of an embodiment is easy storage of the tonneau cover on the vehicle, while allowing the truck driver to have a rear view, in addition to maximizing access to the truck bed. Additionally, such a securement of the panels of the tonneau cover may provide fuel economy benefits.

BRIEF DESCRIPTION OF THE DRAWINGS

FIG. 5 is a schematic view of a mechanism for securing a panel to the truck.

FIG. 7 is a schematic view of a mechanism for holding the panels in the vertical (fully retracted) position.

FIG. 8 is a schematic view of a different mechanism for holding the panels in the vertical (fully retracted) position.

DETAILED DESCRIPTION

Figure 1:
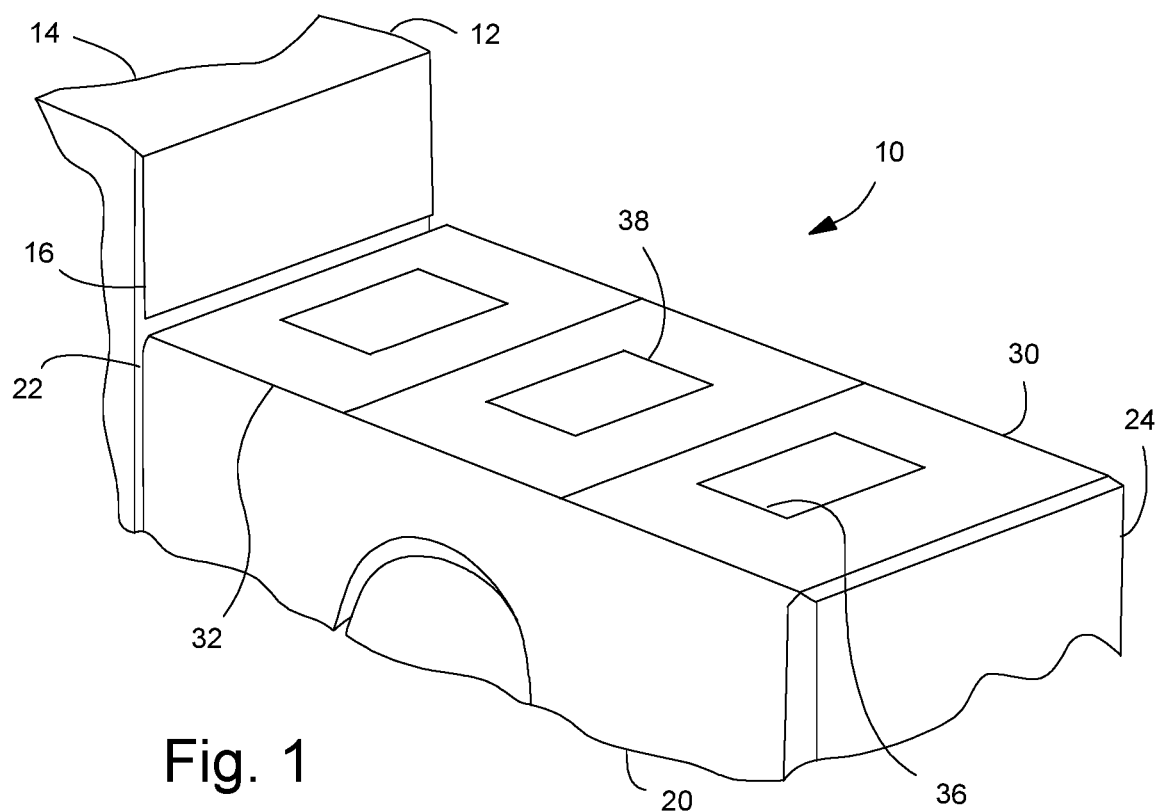
FIG. 1 is a schematic perspective view of a rear portion of a pickup truck, with a tonneau cover extending over a bed in a fully expanded position.
Figure 2:
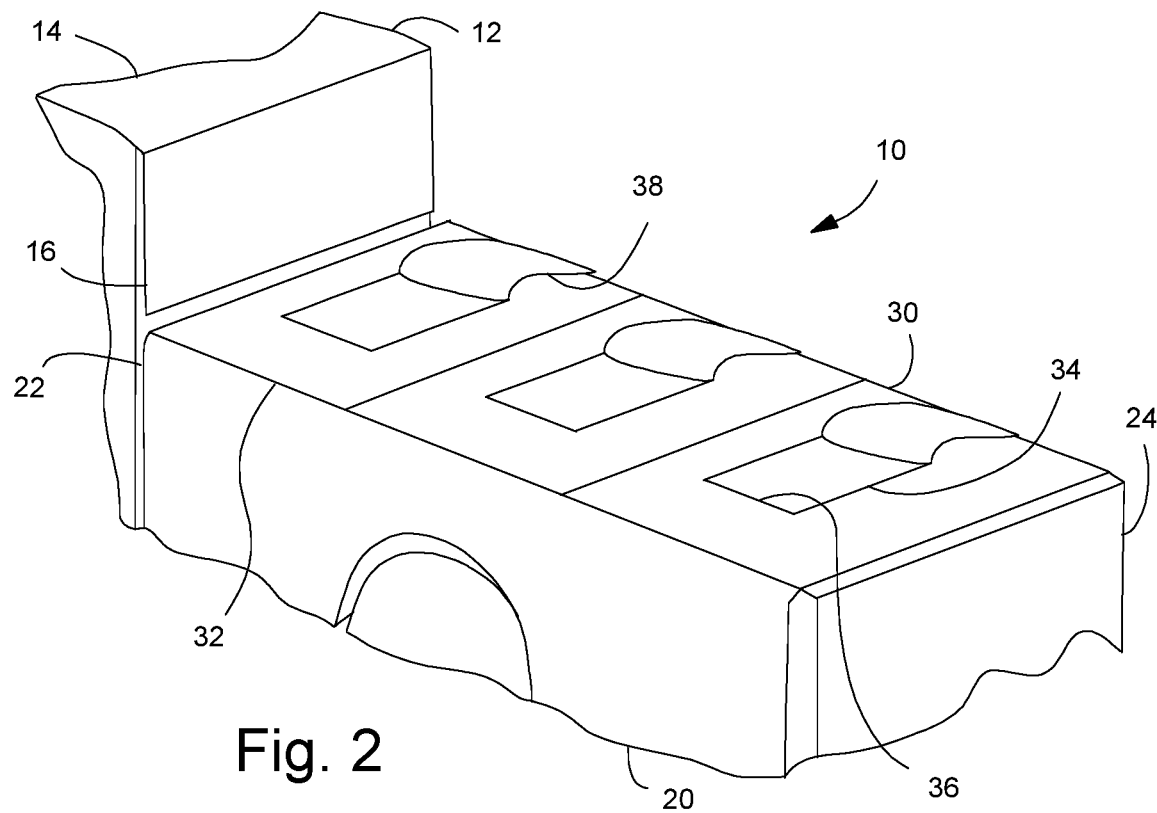
FIG. 2 is a schematic view similar to FIG. 1, but with flaps open to uncover cutouts in panels of the tonneau cover.
Figure 3:
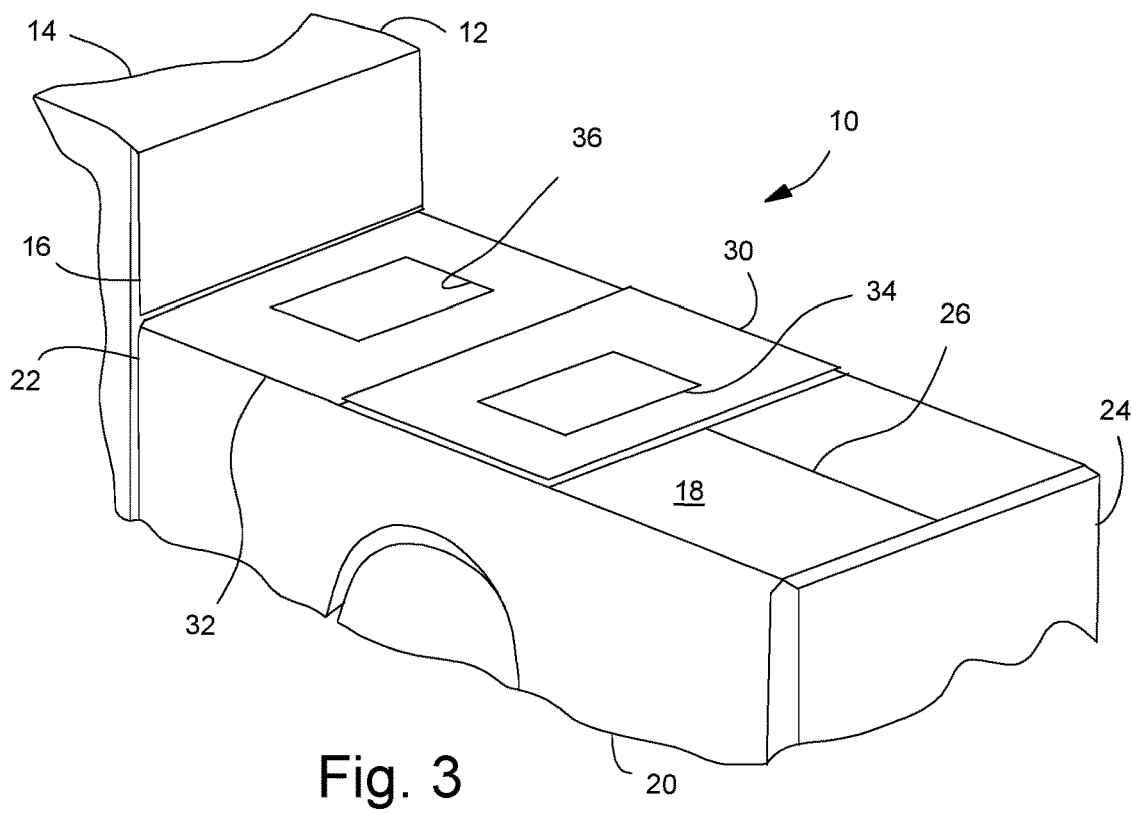
FIG. 3 is a schematic view similar to FIG. 1, but with one of the panels of the tonneau cover folded onto another, a partially retracted position.

FIGS. 1-8 illustrate a portion of a pickup truck 10 having a cab 12, with roof 14 and a rear window 16, in front of a bed 18. The bed 18 may be defined by generally vertically sidewalls 20 extending rearward from a generally vertical front wall 22 to a generally vertical tailgate 24, with a floor 26 extending generally horizontally between the walls 20, 22 and tailgate 24. The specifics of a pickup cab 12 and bed 18 may be conventional if so desired and so will not be discussed in more detail herein.

Removably secured to the top of the bed 18, over the walls 20, 22 and tailgate 24, is a tonneau cover 30. When using the term tonneau cover herein, this refers to a cover over the top of a truck bed, such as a pickup truck, rather than the much older and less commonly used term to refer to a cover for vehicle seats exposed to the elements. The tonneau cover 30 may include multiple panels 32—in the particular exemplary embodiment illustrated herein three panels 32 are shown, although there may be more or less than three panels 32 if so desired. When referring to panels of the tonneau cover herein, the panels are hard panels that do not roll up, but instead fold up as generally rectangular sections stacked together, thus the term panels does not include a soft rollup cover The number and size of the panels 32 are such that, when in a fully expanded position, in a horizontal orientation (see FIG. 1), the panels 32 cover the entire bed 18, thus generally keeping out the elements and creating some privacy and security by generally preventing passersby from seeing and reaching into the bed 18. The panels 32 may be connected together to form, in effect, hinges between adjacent panels 32 in order to allow them to fold on top of each other—see FIG. 3 partially retracted position where one panel 32 is folded onto a second panel 32, and see FIG. 4 partially retracted position where two panels 32 are folded onto a third panel 32.

Each of the panels 32 includes a window 34, made of a transparent material, covering a cutout 36 in the panel 32. Such windows 34 may be bonded to or secured to the panels 32 in another conventional fashion for securing components together.

Also, each of the panels 32 may include a cover 38, sized and shaped to cover over a corresponding window 34. The covers 38 are moveable (or removable) to allow for one to see through the windows 34. Thus, when in closed positions (FIG. 1), one cannot see through the windows 34 due to the covers 38, but when in open positions (FIGS. 2 and 6), one can see through the transparent windows 34. The covers 38 may roll or fold out of the way and be held by conventional releasable means such as a zipper or hook-and-loop fasteners, or slide into pouches in the panels 32 in order to secured the covers 38 in open positions so that one can readily see through the windows 34. The covers 38 may be secured in closed positions over the windows 34 by zippers, hook-and-loop or other conventional releasable means.

The covers 38 may also be mounted on either the undersides of each panel 32 or mounted on top, if so desired. The underside may provide more security for preventing someone from looking into the bed through the windows 34, but the top mounting may be more convenient for moving the covers 38 to the open positions. Alternatively, covers 38 may not be employed and the windows 34 may employ a privacy material that limits viewing through the window when the panels 32 are in the expanded (horizontal) positions.

The panels 32 may be secured to the sidewalls 20 of the bed 18 by employing a releasable assembly, such as for example the assembly 40 illustrated schematically in FIG. 5. This assembly 40 may include for example a rod 42 secured to and extending generally downward from the panel 32, a cam 44 mounted on the rod 42, and a handle 46. The handle 46 may be rotated to release the cam 44 from an underside of a top rail 48 extending along the sidewall 20. Alternatively, other conventional release assemblies may be employed to secure and release the panels 32 from the sidewalls 20 of the bed 18.

When one desires maximum access to the bed 18 without removing the tonneau cover 30 from the vehicle, the partially retracted panels 32 stacked on top of each other (see FIG. 4) may be pivoted upward into a vertical, fully retracted position (see FIG. 6) immediately behind the rear window 16 of the cab 12. As used herein, the term fully retracted position means that the panels 32 are stacked together, oriented vertically, adjacent to and behind the rear window 16. The forward-most panel 32 may be pivotally attached to the front wall 22, sidewalls 20, or in some other way have the bottom of such panel 32 maintained adjacent to the rear window 16 of the cab 12.

The tops of the panels 32 in the fully retracted position may be secured against the rear of the cab 12 with vertical retention assemblies 60, such as for example one of the vertical retention assemblies 60 illustrated schematically in FIGS. 7 and 8.

Figure 4:
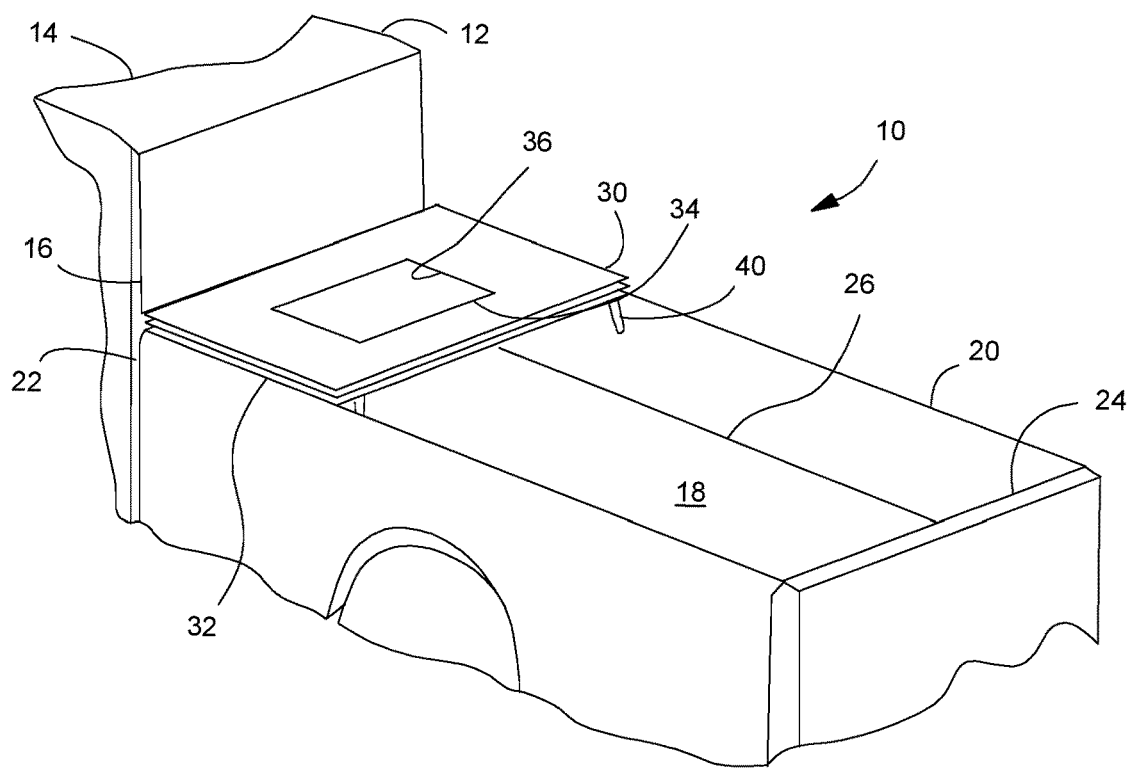
FIG. 4 is a schematic view similar to FIG. 1, but with two of the panels of the tonneau cover folded onto another panel, another partially retracted position.

In FIG. 7, top corners 62 of the panels 32 are secured to roof ditch moldings 64, with for example a quarter turn secure-release latch (fastener) 66. The latch 66 may be longer in one direction than the perpendicular direction, with corresponding oblong holes in the panels 32. Thus, with the latch 66 oriented in a first direction, the panels 32 remain secured vertically (FIG. 6), while a ninety degree rotation allows the panels 32 to pivot away from the latch 66 down to their horizontally oriented (partially retracted) position (FIG. 4).

In FIG. 8, the top corners 62 of the panels 32 are secured to the roof ditch moldings 64, with for example a hook tie-down 68 employing a hook and loop strap 70, with a loop 72 built into roof ditch 64.

Figure 6:
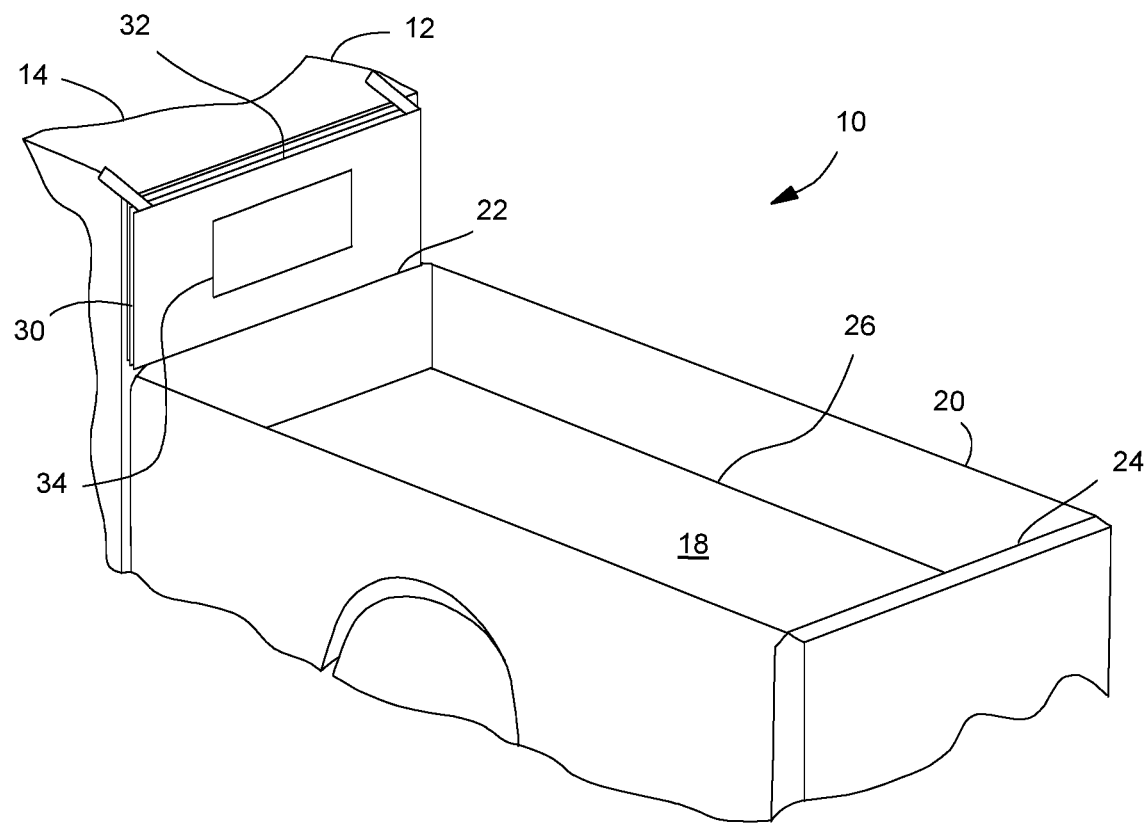
FIG. 6 is a schematic view similar to FIG. 1, but with the flaps open and the panels pivoted up vertically behind a cab of the truck, a fully retracted position.

On will note that, in FIG. 6, the covers 38 are moved out of the way of the windows 34 in the panels 32 when in this fully retracted position, thus allowing a driver to see rearwardly from the cab 12 through both the rear window 16 and the windows 34 in the panels 32. This allows for essentially full access to the bed 18 while still allowing for some rearward view for the driver.

While certain embodiments of the present invention have been described in detail, those familiar with the art to which this invention relates will recognize various alternative designs and embodiments for practicing the invention as defined by the following claims.

The invention claimed is:

1. A tonneau cover comprising:
   a plurality of hard panels configured to selectively secure horizontally and vertically over a pickup truck bed; and
   a window in each panel, each window located to align with the other windows when the panels are oriented vertically in a fully retracted position.

2. The tonneau of claim 1 wherein each window is a translucent plastic sheet covering a cutout in the respective panel.

3. The tonneau of claim 2 including a plurality of covers, each cover releasably securable to the respective panel and sized to block viewing through the respective window.

4. The tonneau of claim 1 including a plurality of covers, each cover releasably securable to the respective panel and sized to block viewing through the respective window.

5. The tonneau of claim 4 including a vertical retention assembly configured to selectively hold the panels in the fully retracted position.

6. The tonneau of claim 1 including a vertical retention assembly configured to selectively hold the panels in the fully retracted position.

7. The tonneau of claim 6 wherein the vertical retention assembly includes a release fastener configured to extend through the panels and secure into a roof ditch molding of the pickup truck.

8. The tonneau of claim 6 wherein the vertical retention assembly includes a loop configured to secure into a roof ditch molding of the pickup truck and a strap configured to releasably secure the panels to the loop.

9. A pickup truck comprising:
   a bed behind a cab having a rear window;
   a tonneau cover including a plurality of hard panels selectively securable horizontally and vertically over the bed; and
   a window in each panel, each window located to align with the other panel windows and the rear window when the panels are oriented vertically in a fully retracted position.

10. The pickup truck of claim 9 wherein each window is a translucent plastic sheet covering a cutout in the respective panel.

11. The pickup truck of claim 10 including a plurality of covers, each cover releasably securable to the respective panel and sized to block viewing through the respective window.

12. The pickup truck of claim 9 including a plurality of covers, each cover releasably securable to the respective panel and sized to block viewing through the respective window.

13. The pickup truck of claim 9 including a vertical retention assembly configured to selectively hold the panels in the fully retracted position.

14. The pickup truck of claim 13 wherein the vertical retention assembly includes a release fastener extending through the panels and secured into a roof ditch molding of the pickup truck.

15. The pickup truck of claim 13 wherein the vertical retention assembly includes a loop secured in a roof ditch molding of the pickup truck and a strap configured to releasably secure the panels to the loop.

* * * * *